April 2, 1929.  A. WINOGRADOW  1,707,453
STEAM SUPERHEATER
Filed June 17, 1927   2 Sheets-Sheet 1

INVENTOR
Alexander Winogradow
BY
Emanuel Scheyer,
ATTORNEY

April 2, 1929. A. WINOGRADOW 1,707,453
STEAM SUPERHEATER
Filed June 17, 1927 2 Sheets-Sheet 2

INVENTOR
Alexander Winogradow.
BY
Emanuel Scheyer
ATTORNEY

Patented Apr. 2, 1929.

1,707,453

UNITED STATES PATENT OFFICE.

ALEXANDER WINOGRADOW, OF NEW YORK, N. Y.

STEAM SUPERHEATER.

Application filed June 17, 1927. Serial No. 199,569.

This device relates to an apparatus for producing superheated steam. It is constructed with an outer container which surrounds an inner one. A heating unit, preferably electrical, is located within the inner container. Water, or other liquid which it might be desired to vaporize, is placed in the outer container. The heating unit in the inner container causes the water in the outer container to boil. The steam generated thereby, passes through an orifice at the top into the inner container, coming into contact with the heating unit. Here the steam is superheated. It then enters a discharge tube at the bottom of the inner container. The tube passes up through the inner container, passes across and through the outer container and discharges outside through a nozzle. In a modified form, the discharge tube passes out from the inner container near its bottom, then on up through the water of the outer container and then discharges outside.

The construction of the device is simple and compact, one heating unit both generating the steam and superheating it. The compactness of the device lends itself to portability.

The device is automatic in heat regulation. If an excess of heat be supplied, the water in the outer container boils more rapidly, causing larger quantities of steam to enter and pass through the inner or superheating chamber in a given time, thereby holding down a temperature of the superheated steam.

Another feature of the device is its ability to raise the pressure and temperature of the superheated steam without increasing the temperature of the heating unit. For this purpose the inner container is withdrawable in varying amounts from within the outer container. The inner container, with its heating unit, can be lowered from the bottom of the outer container thereby reducing the boiling effect of said unit on the water in the outer container. At the same time the smaller amount of steam entering the inner chamber is not reduced in its contact with the heating unit, resulting in higher pressure and temperature for the superheated steam.

The device can be constructed with an orifice at the top of the inner container relatively small to the rate at which the steam is generated in the outer container, whereby the steam reaching the inner container can be greatly superheated and discharged under pressure.

Figure 1:
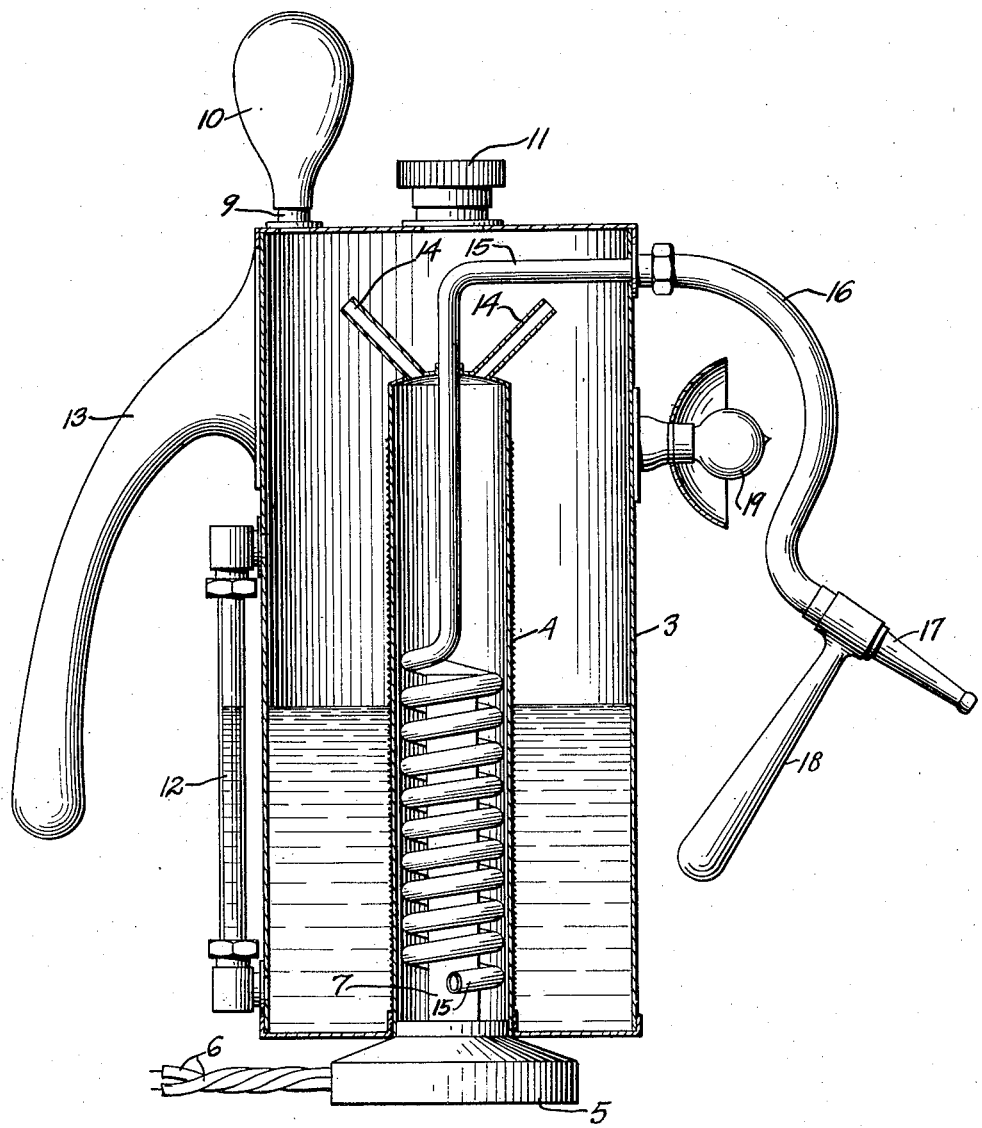
Figure 2:
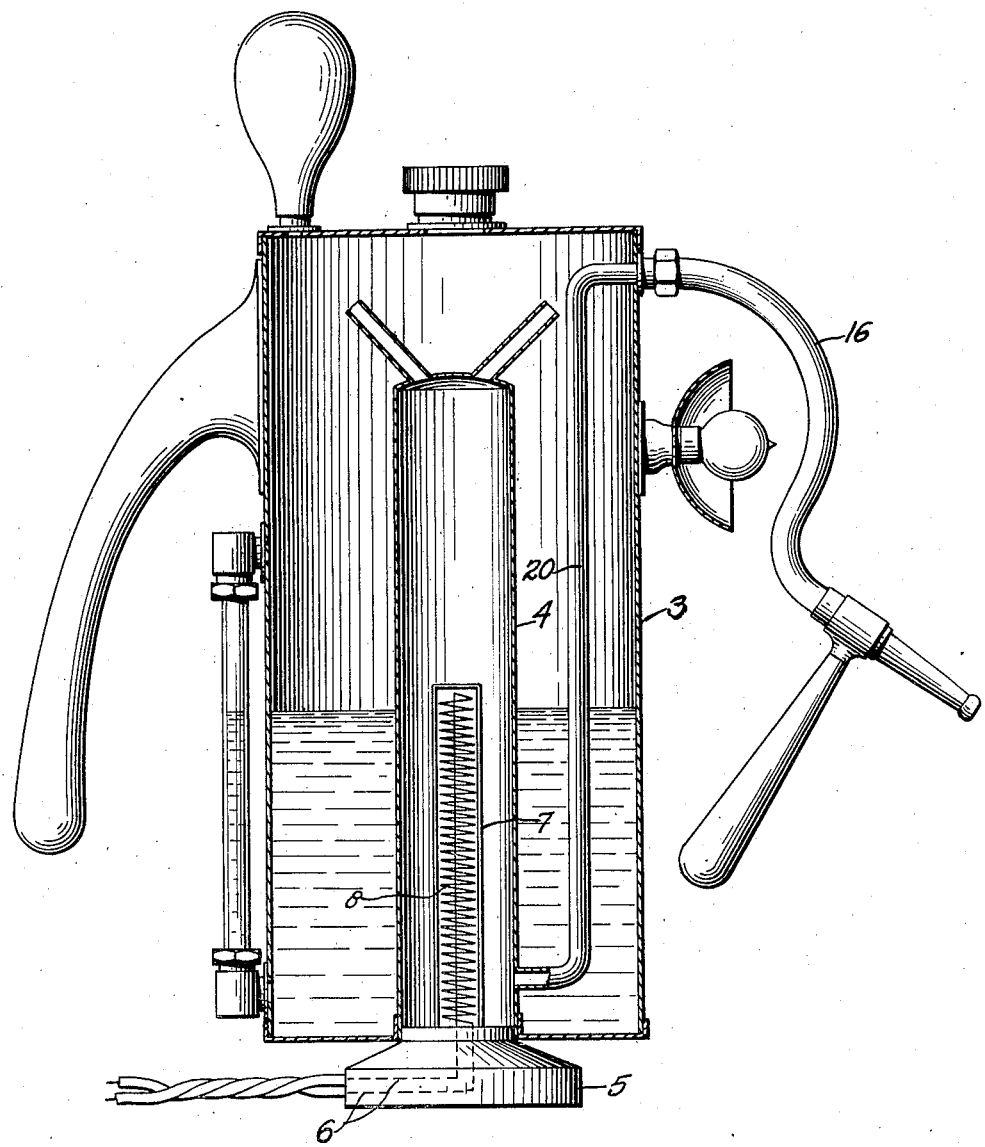

Other objects and advantages will become apparent upon a further study of the specification and drawings in which Fig. 1 is a sectional elevation showing my preferred form, in which the discharge tube passes through the inner container, and Fig. 2 is a sectional elevation showing a modified form in which the discharge tube passes principally through the outer container, the heating unit being also shown in section.

Referring now to Fig. 1, the outer container 3 is provided with a threaded opening at the bottom through which passes the inner container 4 provided with an external thread. The bottom of inner or superheating container 4 is provided with base 5 through which pass wires 6 which carry the current for the resistance coil located in heating unit 7. The numeral 8, in Fig. 2 indicates the resistance coil, a similar one being present in the heating unit of Fig. 1.

The upper end of outer container 3 is provided with an opening from which leads a short tube 9. Attached to the outer end of tube 9 is a rubber bulb 10. Bulb 10 is a pressure safety device, expanding when the pressure becomes too great, or even bursting or flying off tube 9 under extreme pressure. Other forms of safety devices are also suitable as its thin walls permit the ready passage of heat. The ordinary forms of steam safety valves can be used and are especially useful where greater pressures are desired.

Screw cap 11 is provided for another opening in the top of outer container or steam chamber 3. Removal of cap 11, permits the filling of container 3 with liquid. A liquid gage 12 is connected to the side of container 3 for indicating the level of the liquid in said container. A handle 13 is fastened to the side of container 3, where it is desired to have the device portable.

The upper end of inner container 4 is provided with two inlet tubes 14 where the device is portable. Should the device be sufficiently tilted downward to the right (Fig. 1), the water in the outer container 3 would cover the end of the right hand tube 14, in which case the steam would enter inner container 4 through left hand tube 14. With the device tilted to the left, the reverse is true, steam entering the right hand tube 14. Where the device is a stationary superheater, only one such tube as 14 is necessary.

The discharge tube 15 (Fig. 1) is open at its lower end and coils upward about heating unit 7, leaving inner container 4 at its upper end and passing across outer container 3 and on out of it. To the outer end of tube 15 is fastened flexible tube 16, where it is desired to be able to discharge the superheated steam in varying directions. A nozzle 17, provided with directing handle 18, is fastened to the outer end of flexible tube 16.

An electric lamp 19 is provided to enable the operator to see where he is to discharge the superheated steam. Current for lamp 19 is provided by suitable electric connection (not shown) to wires 6.

Heating unit 7 heats up inner container 4 causing the water surrounding it to boil. The steam generated passes into inner container 4, through inlet tubes 14. The steam passes on down through the inner container entering discharge tube 15 at its lower end. As the steam, which entered the inner chamber at a temperature of 212 degrees Fahrenheit, passes down to the discharge tube 15, it is superheated by the action of heating unit 7 and is forced out by its pressure through flexible tube 16 and nozzle 17.

To a certain extent, automatic heat regulation for the superheated steam is obtained. Should inner container 4 tend to rise to too high a temperature, steam would be more rapidly generated in the water surrounding it, causing larger quantities of steam to enter said inner container in a given time thereby chilling said container and holding down the temperature of the superheated steam.

The temperature of the superheated steam can be controlled independently of the current through wires 6 in two ways, one way being fixed and the other variable. In the fixed way, where it is desired to have the superheated steam of high temperature and pressure, the diameter of tubes 14 can be small relatively to the rate steam is formed in the outer container. In the variable way, the temperature and pressure are controlled by screwing down inner container 4 from within outer container 3. The withdrawal of inner container 4, exposes a smaller heating area to the water, causing it to boil more slowly, while at the same time the superheating action of the inner container is not reduced. This causes the smaller amount of steam formed to be superheated to a greater degree.

The only difference between the modified form of device shown in Fig. 2 and that of Fig. 1, is that the discharge tube 20 of the former leaves inner container 4 at the bottom, and travels upward through the water in the outer container 4 to the upper end of said container passing out therefrom and connecting with flexible tube 16. Inner container 4 is not withdrawable in the modified form.

When it is desired to obtain low pressure steam, bulb 10 or cap 11 can be removed.

While the terms "water" and "steam" are used throughout the description and claims, it is to be understood that other liquid and vapor are also intended.

Instead of using an electrical heating unit, other means of supplying heat can be provided, such as by passing heated gas through the interior of the unit.

I claim:—

1. A steam superheating device comprising an outer container for holding water, an inner container located within said outer container and the water, said inner container having a suitable opening for providing communication for steam between said containers, a heating unit located within said inner container, said inner container having walls suitable for the ready passage of the heat to the water, said heating unit causing the water in the outer container to boil, the steam generated thereby passing into the inner container through the opening provided in said inner container where the heating unit superheats said steam, and discharge means leading from the inner container out through said outer container.

2. A steam superheating device comprising an outer container for holding water, an inner container located within said outer container and the water, said inner container having an opening substantially at its upper end for providing communication for steam between said containers, a heating unit located within said inner container, said inner container having walls suitable for the ready passage of the heat to the water, said heating unit causing the water in the outer container to boil, the steam generated thereby passing into the inner container through the opening provided in the inner container, the heating unit superheating the steam entering the inner container, and a discharge tube leading from the lower portion of the inner container out through said outer container.

3. A steam superheating device comprising an outer container for holding water, an inner container coming within said outer container, said inner container having a suitable opening for providing communication for steam between said containers, a base for supporting said device, the inner container projecting up from said base through the bottom of the outer container, a heating unit, supported by said base and coming up within said inner container, for causing the water in the outer container to boil, said inner container having walls suitable for the ready passage of the heat to the water, the steam generated thereby passing into the inner container through the opening provided therein, the heating unit superheating the steam entering the inner container, and discharge means leading from the inner container out through the outer container.

4. A steam superheating device comprising an outer container for holding water, an inner container located within said outer container, said inner container having an opening substantially at its upper end for providing communication for steam between said containers, a heating unit located within said inner container, said inner container having walls suitable for the ready passage of the heat to the water, said heating unit causing the water in the outer container to boil, the steam generated thereby passing into the inner container through the opening provided in the inner container, the heating unit superheating the steam entering the inner container, and a discharge tube leading from the lower portion of the inner container up through said inner container and out its upper portion, and across and out said outer container.

5. A steam superheating device comprising an outer container for holding water, an inner container located within said outer container and projecting upward from its bottom, said inner container having a suitable opening for providing communication for steam between said containers, a heating unit located within said inner container and projecting up from its bottom, said inner container having walls suitable for the ready passage of the heat to the water, said heating unit causing the water in the outer container to boil, the steam generated thereby passing into the inner container through the opening provided therein, and a coiled discharge tube open at its lower end, leading from the lower portion of the inner container up through said inner container and out its upper portion, and across and out said outer chamber, the heating unit coming up within the coils of said discharge tube.

6. A steam superheating device comprising an outer container for holding water, an inner container coming up within said outer container through an opening in its bottom, said inner container being adjustably mounted in said bottom whereby varying amounts of said inner container can be made to project within said outer container, said inner container having an opening substantially at its upper end for providing communication for steam between said containers, a heating unit located within said inner container, said heating unit causing the water in the outer container to boil, the steam generated thereby passing into the inner container through the opening provided in the inner container, the heating unit superheating the steam entering the inner container, and discharge means leading from the inner container out through the outer container.

7. A steam superheating device comprising an outer container for holding water, an inner container coming up within said outer container through an opening in the bottom of the outer container, the mounting of said inner container in said opening permitting relative motion of the containers to each other whereby varying amounts of said inner container can be made to project within said outer container, a heating unit located within said inner container, said heating unit causing the water in the outer container to boil, said inner container having a suitable opening for providing communication for steam between said containers, the steam generated thereby passing into the inner container through the opening provided therein, the heating unit superheating the steam entering the inner container, and a discharge tube fastened to the outer container and projecting into the inner container entering through an opening in its top, permitting relative motion between the tube and the inner container.

8. A steam superheating device comprising a pair of containers, a heating unit located within one of them, the other one for holding water, said containers being in communication for the passage of steam between them and so disposed relatively to each other that said heating unit generates steam in the water holding container and simultaneously superheats the steam in the other, said container with the heating unit having walls suitable for the ready passage of the heat to the water container.

9. A steam superheating device comprising an outer container for holding water, an inner container located within said outer container, a heating unit located within said inner container for causing the water in the outer container to boil, said inner container having a suitable opening for providing communication for steam between said containers, the steam generated thereby passing into the inner container through the opening provided therein, the heating unit superheating the steam entering the inner container, and a discharge tube leading from the inner container and out through the outer container, the heating unit being remote from the outer end of said tube.

10. A steam superheating device comprising an outer container for holding water, an inner container coming within said outer container through an opening in a wall of said outer container, said inner container being adjustably mounted in said wall whereby varying amounts of said inner container can be made to project within said outer container, a heating unit located within said inner container, said heating unit causing the water in the outer container to boil, said inner container having a suitable opening for providing communication for steam between said containers, the steam generated thereby passing into the inner container through the opening provided therein, the heating unit superheating the steam entering the inner container, and discharge means leading from the inner container out through the outer container.

11. A steam superheating device comprising an outer container for holding water, an inner container coming within said outer container through an opening in a wall of said outer container, said inner container being adjustably mounted in said wall whereby varying amounts of said inner container can be made to project within said outer container, a heating unit located within said inner container and fixed therein to move with said inner container, said heating unit causing the water in the outer container to boil said inner container having a suitable opening for providing communication for steam between said containers, the steam generated thereby passing into the inner container through the opening provided therein, the heating unit superheating the steam entering the inner container, and discharge means leading from the inner container out through the outer container.

12. A steam superheating device comprising an outer container for holding water, an inner container coming up within said outer container through an opening in the bottom of the outer container, said inner container being screw threaded in said opening whereby relative rotation of said containers will permit varying amounts of said inner container to project within said outer container, a heating unit located within said inner container, said heating unit causing the water in the outer container to boil, said inner container having a suitable opening for providing communication for steam between said containers, the steam generated thereby passing into the inner container through the opening provided therein, the heating unit superheating the steam entering the inner container, and a discharge tube fastened to the outer container and projecting into the inner container entering through an opening in its top concentric with the axis of said rotation, permitting relative motion between the tube and the inner container.

13. A steam superheating device comprising an outer container for holding water, an inner container located within said outer container and the water, a heating unit in the inner container for causing the water in the outer container to boil, said inner container having an opening substantially at its upper end for providing communication for steam between said containers, the steam generated thereby being permitted to pass into the inner container through said opening, the heating unit superheating the steam entering the inner container, discharge means leading from the inner container out through said outer container, a handle mounted on one side of said outer container for holding the device, a tube pointing toward that side of the outer container on which the handle is mounted, said tube leading outward from said opening in the top of the inner container, whereby when the device is tilted toward the side away from the handle, the outer end of said tube remains above the water in the outer container, for the entrance of steam into the inner container.

ALEXANDER WINOGRADOW.